(No Model.)
D. A. SPRAGUE.
Side Spring Vehicle.
No. 233,293. Patented Oct. 12, 1880.
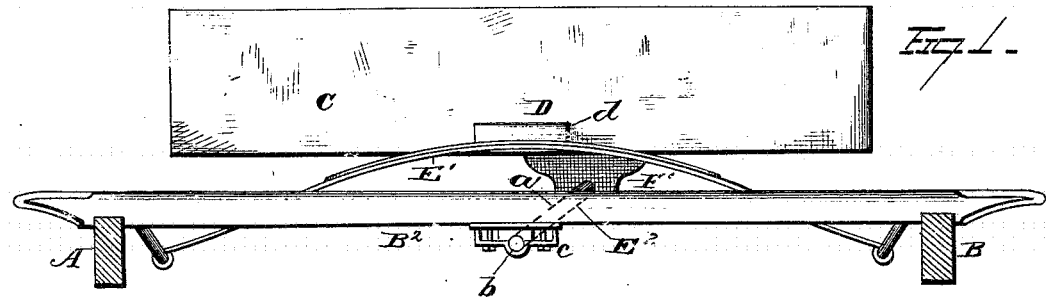
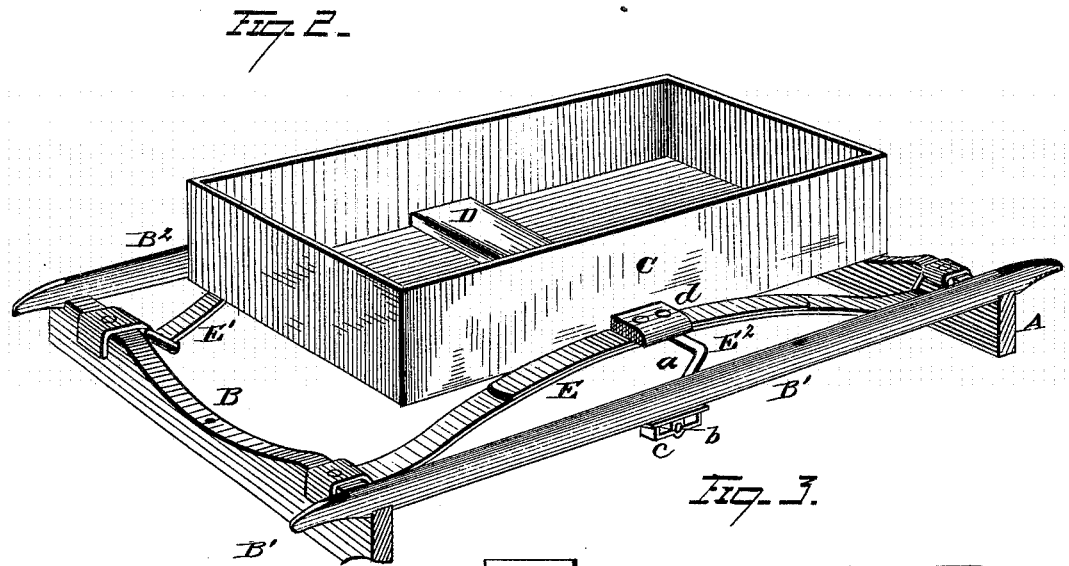
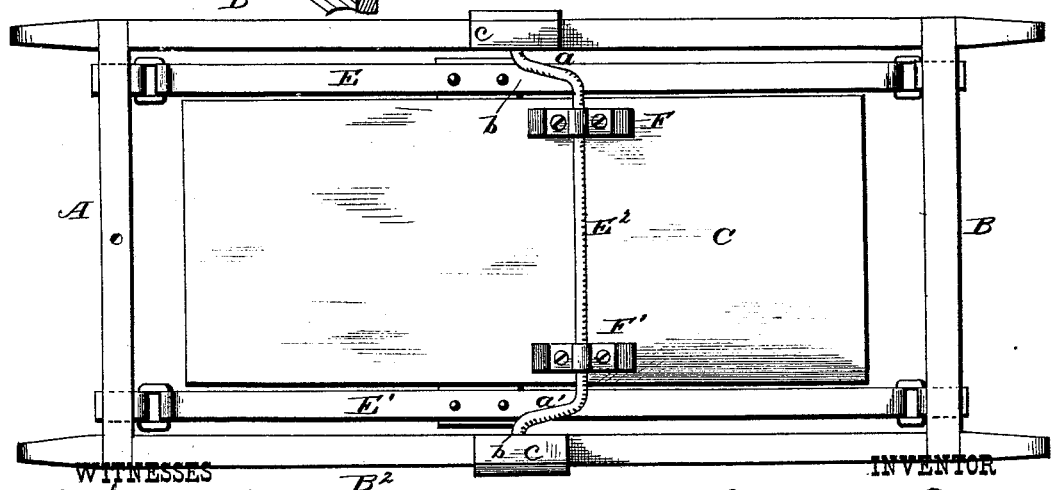
WITNESSES
E. J. Nottingham.
A. W. Bright
INVENTOR
Daniel A. Sprague
By H. A. Seymour.
ATTORNEY
N. PETERS, PHOTO-LITHOGRAPHER, WASHINGTON, D. C.

UNITED STATES PATENT OFFICE.

DANIEL A. SPRAGUE, OF POLAND, NEW YORK.

SIDE-SPRING VEHICLE.

SPECIFICATION forming part of Letters Patent No. 233,293, dated October 12, 1880.

Application filed September 1, 1880. (No model.)

*To all whom it may concern:*

Be it known that I, DANIEL A. SPRAGUE, of Poland, in the county of Herkimer and State of New York, have invented certain new and useful Improvements in Wagons; and I do hereby declare the following to be a full, clear, and exact description of the invention, such as will enable others skilled in the art to which it pertains to make and use it, reference being had to the accompanying drawings, which form part of this specification.

My invention relates to an improvement in wagons, the object being to provide an equalizer for preventing the wagon-body from inclining or sagging to either side when the load is disposed on either side of the longitudinal center of the wagon-body.

Heretofore side-bar wagons have had their side springs connected in various ways to crank shafts or rods supported on the forward and rear axles or on the side bars of the vehicle. Such construction and arrangement of parts has been found defective, owing to the fact that links must be interposed between the springs and equalizing-bars, and the links are not only productive of noise, rendering their employment disagreeable to the occupant of the vehicle, but they also require renewal after a comparatively short wear, as the entire load of the wagon-body and contents is supported by such connecting-links. Again, when links are used the wagon-body is allowed a longitudinal movement, which is unpleasant to many.

My invention consists in the combination, with a wagon-body and side bars, of a rock-shaft supported in bearings attached to the wagon-body, the ends of the rock-shaft or equalizing-bar being supported in bearings attached to the side bars of the wagon, whereby pressure on one side of the wagon-body is evenly and equably transmitted to the opposite side thereof, and the wagon-body is prevented from longitudinal movement.

My invention further consists in certain other details of construction and combinations of parts, as will hereinafter be described and pointed out in the claims.

In the accompanying drawings, Figure 1 is a view, in side elevation, of a wagon embodying my invention. Fig. 2 is a view, in perspective, and Fig. 3 is a plan view, of the under side of the wagon-body.

A represents the pivoted cross-bar over the front axle, and B the rear axle, and B' B² the side bars, which are firmly secured to them.

C represents the wagon-body provided with a transverse frame-piece, D, the opposite ends, $d\ d$, of which project from the opposite sides of the wagon-body.

E E' are the side springs, connected at opposite ends to the pivoted cross-bar A and rear axle, B, in any suitable manner, while their central portions support the wagon-body, the springs being secured to the projecting ends $d$ $d$ of the piece D.

A rock-shaft or equalizing-bar, E², is supported in suitable bearings F F, attached to the under side of the wagon-body. Cranks $a\ a'$ are formed on the outer portions of said equalizing bar or shaft, said cranks being bent outwardly at their ends parallel to the main body of the bar or shaft, forming journals $b\ b$, which are supported in suitable bearings $c\ c$, secured to the under side of the side bars, B' B².

The equalizing-bar or rock-shaft being journaled at a point below the side springs, can never interfere with the free operation of the latter. When any weight is supported on one side of the wagon-body, the latter is depressed evenly on opposite sides, as the equalizing-bar or rock-shaft operates to retain the wagon-body in a horizontal position.

One important result effected by my invention is, that all end movement of the wagon-body is prevented, which result not only adds to the comfort and ease of the vehicle, but also takes end strain from the side springs.

As no links or joints are employed in connection with the equalizing-bar or rock-shaft, the construction is simplified, the cost lessened, and undue wear avoided. Again, the equalizing-bar, being journaled in bearings attached to the wagon-body and side bars, is noiseless in its operation.

It is obvious that many slight changes in the construction and relative arrangement of parts might be made without departing from the spirit of my invention. Instead of placing a single equalizing-bar or rock-shaft beneath the central portion of the wagon-body, they may be located beneath the opposite ends thereof, if desired. Hence, I would have it understood that I do not restrict myself to the exact construction and arrangement of parts shown and described; but, Having fully described my invention, what I claim as new, and desire to secure by Letters Patent, is—

1. The combination, with a wagon-body, side springs, and side bars, of an equalizing-bar (one or more) supported in bearings attached to the body and the arms of the equalizing-bar journaled in bearings attached to the side bars, substantially as set forth.

2. The combination, with a wagon-body, side springs, and side bars, of a single equalizing-bar supported in bearings attached to the under side of the wagon-body, near its longitudinal center, the arms of the equalizing-bar being journaled in bearings attached to the side bars, substantially as set forth.

3. The combination, with a wagon-body, side springs, and side bars, the latter located outside the side springs, of an equalizing-bar connected directly with the wagon-body and side bars, substantially as set forth.

In testimony that I claim the foregoing I have hereunto set my hand this 25th day of August, 1880.

DANIEL A. SPRAGUE.

Witnesses:
J. T. WOOSTER,
DAN. P. WOOSTER.